United States Patent [19]

Helleur

[11] 3,920,505
[45] Nov. 18, 1975

[54] METHOD AND APPARATUS FOR REMOVING VOLATILE FLUIDS

[76] Inventor: Donald Edmund Helleur, 221 Mortlake Ave., St. Lambert, Quebec, Canada

[22] Filed: Aug. 7, 1973

[21] Appl. No.: 386,406

[30] Foreign Application Priority Data
Aug. 9, 1972 United Kingdom............... 37102/72

[52] U.S. Cl.......... 159/47 WL; 159/13 C; 159/48 R; 159/49
[51] Int. Cl.².... B01D 1/00; B01D 1/16; B01D 1/22
[58] Field of Search...... 159/4 A, 13 A, 47 WL, 49, 159/13 C, 16 A, 48 R, 4 GC, 4 MS, 4 V, 17 VS; 162/30, 31, 32

[56] References Cited
UNITED STATES PATENTS

| | | | |
|---|---|---|---|
| 1,491,486 | 4/1924 | Marquard et al. | 159/4 A |
| 2,611,681 | 9/1952 | Bellinger | 159/4 A |
| 2,921,004 | 1/1960 | Wood | 159/4 VM |
| 3,439,724 | 4/1969 | Mason | 159/13 C |
| 3,515,200 | 6/1970 | Shah | 159/47 WL |
| 3,557,864 | 1/1971 | Berg | 159/4 A |
| 3,574,051 | 4/1971 | Shah | 159/13 C |
| 3,638,708 | 2/1972 | Farin | 159/4 A |

FOREIGN PATENTS OR APPLICATIONS
281,743  3/1952  Switzerland...................... 159/13 A

*Primary Examiner*—Jack Sofer
*Attorney, Agent, or Firm*—Lawrence I. Field; Ian Fincham

[57] ABSTRACT

A method and apparatus for the removal and recovery of volatile or evaporable substances from materials containing them. In other embodiments, the invention is readily applicable for the simultaneous incineration and concentration of such materials, particularly spent water-diluted effluents from industries and municipalities as well as for the generation of electric power from various thermal fuels, particularly power gas produced from coal or oil.

The invention involves producing hot gases and bringing them into an intimate, turbulent, direct-contact heat-exchange relationship with a constantly recycling flow of water or a liquid concentrate of the material; recovery of the water as steam or of the volatile substance is effected in a single-effect flash evaporator in association with the single direct-contact heat-exchange step. High thermal efficiencies can be obtained when operating at pressures substantially higher than atmospheric.

6 Claims, 8 Drawing Figures

METHOD AND APPARATUS FOR REMOVING VOLATILE FLUIDS

This invention relates to a method and apparatus for removing and recovering volatile or evaporable substances from materials containing them. In particular, it relates to a process for removing water from materials containing non-volatiles thereby concentrating the non-volatile part of the material for incineration or further processing. Other embodiments relate to the generation of power from various thermal fuels.

In the manufacture of wood pulp, liquors and other organic non-cellulosic, non-volatile substances are extracted from the wood by digestion with aqueous solutions called cooling liquors. After digestion and their separation from the pulp, these liquors are referred to as spent liquors. In some pulping operations, these spent liquors are reclaimed and concentrated and the organic content of the liquor burnt to recover the heat value, and the inorganic compounds collected for re-use. In other operations it is uneconomical to do this and the liquors are discharged into rivers and streams creating pollution problems. This is particularly true of very dilute spend liquors from processes producing pulps of very high yields (or high pulp to wood ratios); for these liquors evaporations or concentration costs would be very high because of the large water load.

It is, therefore, a primary object of the present invention to provide an inexpensive method of concentrating these liquors so that they may be disposed of by incineration and the heat value can be recovered where desired.

Many efforts have been made to develop methods of concentrating these liquors but even the best methods still employ fairly expensive equipment and operating problems, such as scaling, continue to appear.

These scaling problems are generally the result of using indirect contact techniques (such as tube heat exchangers) for transferring heat from one medium (steam) to another (the spent liquor). A direct contact heat exchange approach would eliminate many of these problems and if properly employed high levels of heat transfer can be effected.

Direct-contact methods of evaporation were used since very early times but improvements to these prior art approaches have unfortunately been lacking. One such apparatus, known as the Porrion evaporation, consists of circular disks of sheet metal assembled on a central shaft, and mounted over a trough containing the solution to be evaporated. Waste gases from an incinerator pass over the apparatus. As the shaft rotates the disks carry a film of liquid up into the gas where evaporation takes place. The system is cumbersome, inefficient and of low evaporative capacity.

Others, who use direct-contact methods and in their desire to improve thermal efficiencies, have developed very elaborate and expensive systems which use multiple stage heating and evaporation. None of these prior art inventors appear to be aware of how one could improve on the earlier simpler methods and make them respond to the needs of the day.

In present times when pollution and the disposal of spent wastes is of critical concern, there is urgent need for a simple method of getting rid of these wastes, particularly for a method whose thermal efficiency can be increased in a very simple manner should the increased cost warrant such an increase in efficiency. And in any event, the capital cost of any of the embodiments of this invention will be a fraction of the capital cost of these prior art methods.

It is therefore a particular object of this invention to improve direct-contact evaporation to a point where it will provide a simple and inexpensive method for disposing of spent liquors. A method whose thermal efficiency can be increased by a further simple process change.

It is also a general objective of the present invention to improve direct-contact techniques such that they can be used in removing volatiles from materials containing them in a highly compact and efficient manner. Such volatile would include evaporable and condensable substances such as water, organic solvents and the like, as well as substances which can be stripped from solutions containing them, for example gases such as sulphur dioxide, ammonia, hydrogen sulphide, chlorine, carbon dioxide, nitrogenoxide and the like which would be present in solutions containing them.

With the above and other objects in view, this invention resides in the novel features of form, construction, arrangement and combination of steps and means presently described and pointed out in the claims.

Broadly speaking, the present invention relates to a method and apparatus for evaporating and/or stripping volatile substances from material containing them particularly spent industrial materials containing substantial amounts of water (e.g. effluents from pulp and paper plants) or organic solvents (e.g. effluents from oil refineries and the like) as well as municipal wastes. If the material is a fluid the volatile components can be removed more directly; for non-fluid materials the volatiles may be removed by an indirect approach.

A typical form of the invention, comprising a process for concentrating and burning such wastes as spent pulping liquors having a high water content, comprises:

a. burning or incinerating the spent liquor in an atmosphere of air or substantially pure oxygen (preferably oxygen) at as high a water content as is feasible, to produce hot gases containing a substantial portion of their heat available in the form of radiant energy and steam (i.e. a condensable gas) and removing any ash or smelt that has formed;

b. introducing these radiant and condensable gases while they are burning and/or immediately thereafter into the lower end of a vessel containing a lower reservoir of the spent liquor and an upper freeboard area and venting the gases after they are cooled and saturated with water vapour at the top end of the element;

c. removing spent liquor from the lower reservoir and bringing it into intimate and turbulent contact with the hot gas, as, for example, by violently spraying the liquor into the freeboard area in such a way that all three main methods of heat transfer (i.e. radiant, mass and conductive transfer) are used to the fullest extent possible to thereby cool the hot gases as quickly as possible and convert a further portion of the water content of the spent liquor into steam and/or water vapour which can be vented along with the gas (or alternatively used to heat the liquor for purposes of flash evaporation in a separate chamber) and then allowing the remaining portion of the spent liquor to collect in the lower reservoir;

d. continuing to remove and spray the spent liquor in a recycling manner until the recycling spent liquor reaches a concentration where it will burn as described in the above mentioned step;
e. introducing sufficient unconcentrated spent liquor containing a high water content into the reservoir and removing sufficient concentrated liquor from the reservoir for burning in order to keep the recycling liquor at the desired concentration and level in the reservoir.

As mentioned under (c) a further embodiment provides for the removal of a substantial portion of the water content of the spent liquor independently of the gas and comprises modifying step (c) above as follows:

c. (modified) removing spent liquor from the lower reservoir and spraying it into a flash chamber, having a pressure lower then that in the vessel, to convert a portion of the spent liquor into steam, thereby concentrating the liquor and cooling it, removing the steam from the flash chamber, removing the cooled concentrated spent liquor and spraying the liquor into the freeboard area to cool the gas and condense a portion of the steam and thereby heating the liquor, allowing the heated liquor to collect in the reservoir.

A further important embodiment provides for a substantial increase in the thermal efficiency of the above embodiments by conducting all of the above process steps at elevated gas pressures (i.e. pressure substantially above atmospheric) for example, if the pressure in the combustion and freeboard areas is increased to te 250 psia (pounds per square inch absolute pressure) level, steam may be removed from the flash chamber at a level in the order of 70 psia, at this level the steam is readily usable as process steam. At the lower pressure levels, the steam produced can be used for simple heating purposes.

In fact, in certain situations, certain embodiments particularly the very simple one without the flash evaporation step, could be conducted at pressures below atmospheric (particularly, where the vented gases contain a very high proportion of water vapour i.e. an easily condensable gas). At these lower pressures, the amount of water vapour ventable from the system can be increased substantially. In the case of water vapour, these lower pressures could be easily and simply maintained by passing the vented gases through a cold water spray tower thereby condensing the water vapour and then discharging the non-condensable gases through a vacuum pumping system to the atmosphere.

Of course, at pressures above atmospheric the opposite is true and less water vapour is ventable, the amount being inversely proportional to the total pressure in the system, and it is this fact which makes possible the higher thermal efficiencies at these higher pressures whenever the flash evaporation step is used. Such facts were not properly realized and taken advantage of by prior inventors.

Direct-contact heat-exchange as mentioned can be a very efficient method particularly if the heat required for the evaporation is transmitted by radiation rather than by conduction or convection. Thus for maximum efficiency it has been found that the present invention should be carried out, whenever possible, by introducing into the freeboard area those gases having (radiation) emission bands of a significant magnitude. Such gases are generally heteropolar and composed of non-symmetrical molecules; those of industrial significance include carbon monoxide, hydrocarbon, water vapour, carbon dioxide, sulphur dioxide, ammonia and hydrogen chloride. In the above example, it was therefore desirable to carry out the combustion in the presence of as much water as possible; in addition, since nitrogen is not a highly radiant gas, it is desirable to use substantially pure oxygen rather than air, to effect the combustion of the organic materials.

In addition, direct-contact heat-exchange can be further increased many fold by making proper use of mass heat transfer i.e. by involving to the fullest extent the use of a volatile or evaporable condensable gas as a medium of heat transfer. Fortunately, water with its high latent heat of condensation or evaporation, is a common constituent in most industrial wastes. Thus, as another prominent feature, this invention should be carried out in such a way that the combustible energy of the material in the spend wastes is transferred as soon as possible into the latent energy of a condensable gas such as water vapour or steam, so that in that form this latent energy will be readily and quickly convertible/available as a source of heat for heating further liquor.

In fact the same water may condense and evaporate many times in a given pass through the heat exchange step, but in so doing it serves its function of transfering the heat from the combustion products to and from the recycling liquid and this invention provides the environment for this to take place.

As mentioned previously, none of the previous prior art has disclosed how these various modes of heat transfer can be properly combined in a simple efficient and compact way to accomplish the various objectives hereinabove described.

An interesting further application of the above two features, involves passing low grade process steam such as steam from paper/pulp driers or from pulping operations through the gas heating step so that the heat is transferred to a gas which is capable of re-transmitting the heat energy efficiently to the liquors to be treated. In addition, if the present process is to be carried out at elevated pressures this steam will have to be put through a compressor and its total energy will then be made available at a more useful level (that is after it has condensed in the vessel and re-evaporated in the flash chamber).

In the above example, the spent liquor contained both combustible organic compounds as well as inorganic compounds, the heat values of the combustibles were used to concentrate the dilute liquor, and the values of the inorganics could be recovered from the residual ash following the combustion step. For spent liquors containing smaller or negligible amounts of combustibles, the thermal energy required to sustain the present process may be supplied by or from other means, for example: burning oil, coal and the like; using waste heat from other operations such as that from metallurgical operations.

In the above example, the emphasis was on the concentration of the spent liquor through the evaporation of the water; in other applications of the present invention undesirable volatiles can be removed from liquors containing them by spraying such liquors in the freeboard area and allowing the gases to carry them away. Where desirable these volatiles can then be stripped/reclaimed from the gases by well known absorption operations. When the modified (c) step above is used a large portion of these volatiles will also be removed in the flash chamber and can be easily recovered.

It will be apparent from the above descriptions that the present invention provides several opportunities for byproduct production, for example: inorganic compounds from the combustion of the concentrated liquors; hot water from the condensation of the steam from the flash chamber or process steam from the flash chamber when the operations are carried out at higher pressures; heat from the humid gases vented from the vessel or mechanical energy from these gases whenever the operations are carried out at elevated pressures (this mechanical energy may be extracted by passing the gases through a gas expander and the shaft energy used directly or converted into electrical energy).

The present invention will be discussed further at least in part with reference to the drawing in which.

Figure 1:
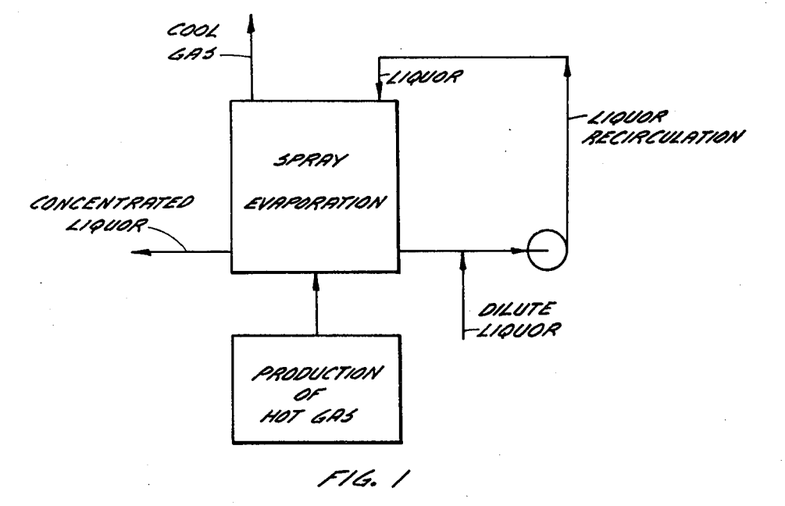
FIG. 1 is a schematic representation of one basic embodiment of the invention.

Referring now in more detail and by reference characters to the drawings, one embodiment of the present invention is illustrated in FIG. 1 where it is shown in one of its simplest forms.

As shown in FIG. 1, hot radiant gases are produced and are immediately introduced into an area where concentrated liquor is being continuously spray evaporated and recirculated, the hot gases are cooled by the spray evaporation and carry the volatile liquid medium from the liquor with them as they leave the vessel, the volume of liquor is kept in balance by continuously feeding dilute liquor into the system and withdrawing concentrated liquor, which may be used to produce the hot gases or used in other processes. As will be further discussed, these gases are brought into a single intimate, turbulent direct-contact relationship with this recycling liquid so as to utilize to the fullest extent the three main methods of heat transfer mentioned above.

Figure 2:
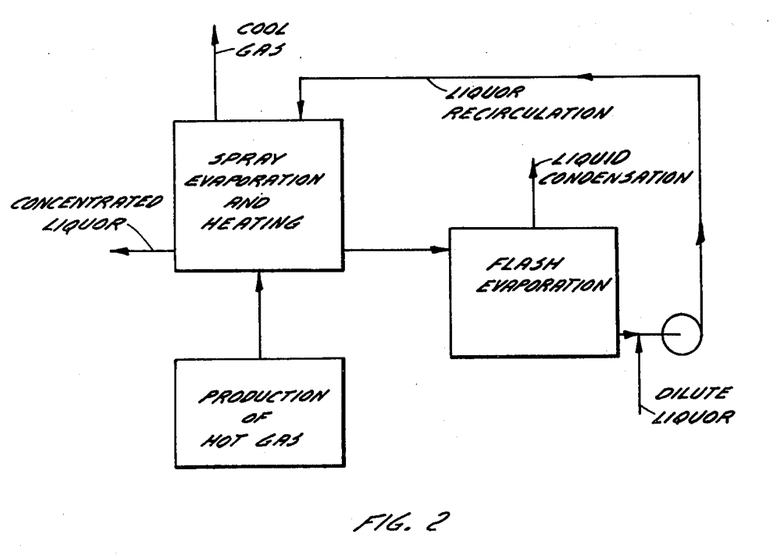
FIG. 2 is a schematic representation of another basic embodiment of the invention.

FIG. 2 illustrates a variation to the above process wherein the circulating concentrated liquor is flash evaporated in a single-effect flash evaporator and after dilution with feed liquor is spary evaporated in the direct contact heat exchanger; and the vacuum of the flash evaporation is supplied by the condensation of the volatile liquid medium (alternatively or in addition to the condensation the vacuum could be maintained by vacuum pumping). Alternatively and for better process control, the liquor recirculation of FIG. 1 could be maintained at the same time that the liquor is recirculated through the flash chamber.

Figure 3:
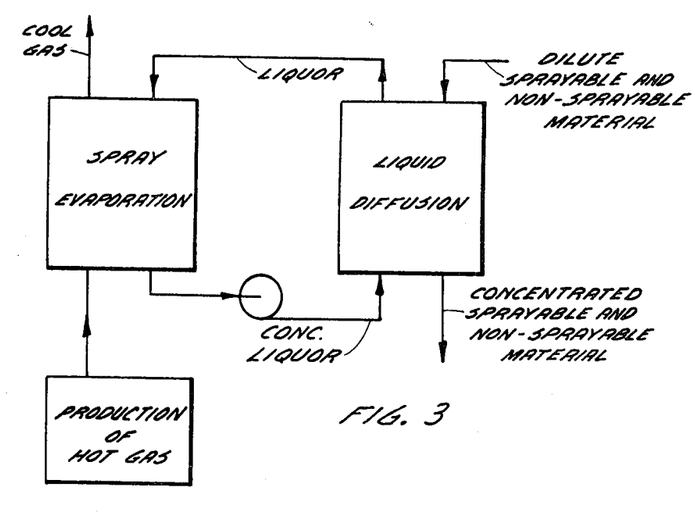
FIG. 3 is a schematic representation of another basic embodiment of the invention involving both sprayable and non-sprayable materials.

FIG. 3 illustrates a further variation wherein certain diffusible non-sprayable materials may be concentrated by mixing the sprayable and non-sprayable materials together and passing them through a diffusion chamber through which the circulating concentrated sprayable liquor is passing counter current to the flow of the materials. In a further variation the flash evaporation step of FIG. 2 could be included prior to the diffusion step.

In the above embodiments, the dwell time of the sprayed liquid material in direct-contact heat-exchange step can be increased if desired by known methods of liquid-gas suspension, e.g. fluidize bed techniques.

An alternative method of adapting the present invention to non-sprayable material of high water content (i.e. too high for the material to support its own combustion) involves dividing the direct-contact heat exchange process into essentially two zones, namely one of evaporation and one of condensation. Thus, the wet material is brought into contact with the hot dry radiant gases until these gases become substantially water saturated and the material becomes drier, the wet gases are then separated from the material and passed through a direct-contact heat-exchanger spray tower where, as illustrated in FIG. 2, a substantial portion of the water is condensed and the liquid so formed is converted into flash steam in a flash evaporator. The drier material, if combustible, can then be used to produce the hot gas.

In the above illustrated examples a spent pulping liquor (e.g. kraft liquor, sulphite liquor of any base, and the like) would be an example of a sprayable material and barking and pulp and paper wastes from pulp operations would be an example of a non-sprayable material.

Figure 4:
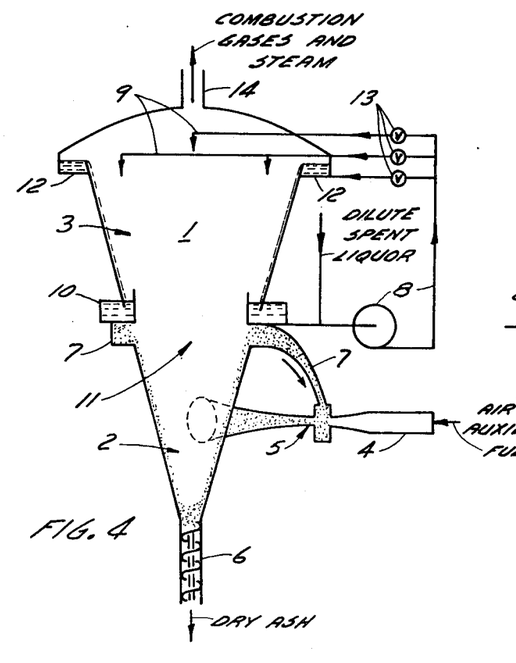
FIG. 4 is a diagrammatic representation of one embodiment of the method and apparatus in which the combustion, ash separation, direct-contact evaporation and scrubber are very closely associated.

As shown in FIG. 4, the apparatus of one embodiment of the invention includes a main conical vessel 1 consisting of two main chambers, a lower chamber 2 for final combustion and ash separation, an upper chamber 3 having a freeboard area of liquid-gas interaction, chamber 2 having as associated equipment, an ignition and initial combustion chamber 4 for igniting the auxiliary fuel required to start and, if necessary, maintain combustion, a venturi device 5 to assist in recycling unburnt material, a screw valve 6 to release ash from combustion chamber 2, a recycle system 7 to collect unburnt material and return it via venturi 5 to combustion chamber 2, the gases from the ignited auxiliary fuel and the recycled gases and material are introduced tangentially into cyclone chamber 2 through devices 5 device form a vortex such that the solid materials tend to move to the sides of the cyclone under the influence of the centrifugal forces of the vortex; and chamber 3 having, as associated equipment, pump and piping 8 to receive concentrated spent liquor and convey it to spray system 9 which distributes the spent liquor throughout the freeboard area allowing the sprayed liquor to react with the combustion gases rising from the lower chamber 2 and subsequently to collect on the sides of chamber 3 and flow into a collecting reservoir 10 or pass through opening 11 in the bottom of chamber 3 into the combustion zone of chamber 2 where the organic portion of the liquor is allowed to burn and produce further hot gases and an ash; in addition, pump and piping system 8 also delivers liquor to reservoir 12 in which the liquor is allowed to overflow and run down the sides of chamber 3 into the hotwell or reservoir 10 which feeds the pump and piping system 8; manipulation of valves 13 allow the liquor to be distributed in the desired proportion to the three locations, namely, (a) to reservoir 12, (b) to the center of vessel 1 so that a large portion will find its way into the combustion zone, and (c) to one side of the center so that a major proportion will collect on the sides of chamber 3; the combustion gases saturated with water vapour and cooled by their interaction with the sprayed liquor are vented through opening 14 at the top of chamber 3; to start up the system, the valve controlling the liquor to location (b) above would be shut off or the flow substantially decreased and the liquor circulated until the concentration of the liquor reaches the level at which it will burn in the combustion zone, the volume of liquor in the system would be maintained by the introduction of dilute liquor; once the desired concentration was reached the system would be kept at that point by opening the valve controlling the distribution of the liquor to the center of the vessel so that a portion of the concentrated liquor would be allowed to leave through the center opening and the desired volume of circulating liquor would be maintained by the introduction of fresh dilute liquor; the vortex generated in chamber 2 will tend to carry up into chamber 1 such that the liquid particles generated by the spray system will tend to move towards the sides of the chamber; the size of the opening between chambers 1 and 2 can be varied by obvious structural changes, for example by bringing reservoir 10 closer in towards the center with or without a change in the angle of slope of the sides of the upper cyclone chamber.

Figure 5:
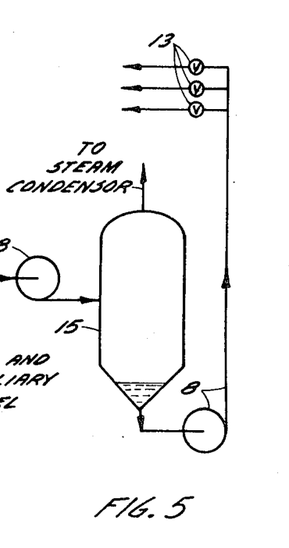
FIG. 5 is a diagrammatic representation of a section of another embodiment of the method and apparatus in which the combustion, ash separation, direct-contact evaporation and scrubber are again very closely associated as shown in FIG. 4 except that a substantial portion of the evaporation now takes place in a separate flash chamber.

FIG. 5 illustrates a further embodiment based on FIG. 4 (only the right side of the figure is shown, the rest is as shown in FIG. 4) wherein the concentrated liquor is removed from reservoir 10 and passed through flash chamber 15 which is subjected to a pressure less than that in vessel 1, this lower pressure, may, for example, be maintained by a condenser which condenses the water vapour being flashed in chamber 15, the flashing and removal of the water vapour further concentrates the liquor, this further concentrated liquor is removed from the flash chamber by the pump and piping 8 and distributed as before to reservoir 12 and to the various spray points; alternative to adding dilute liquor at a point before pump 8, the dilute liquor may if desired be added in vessel 1 by spraying it into the freeboard area at some point above the main concentrated liquor sprays, this dilute liquor can thus be used, among other things, to further cool the gases and to remove concentrated liquor entrained in the upwardly moving gases.

Figure 6:
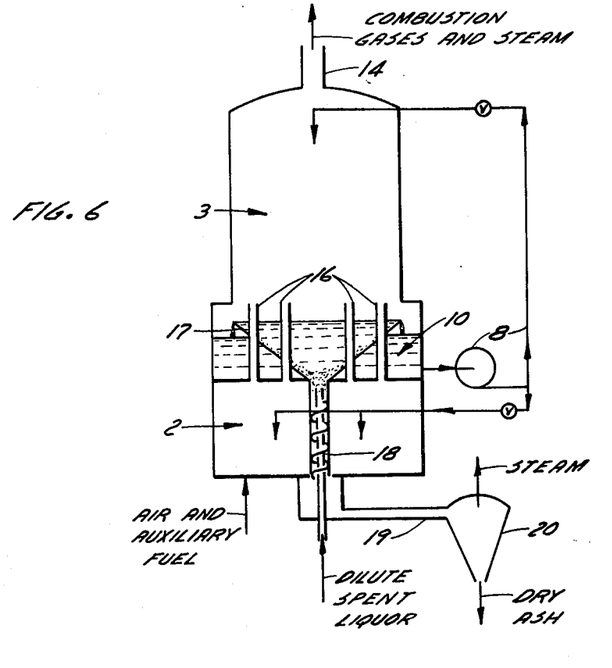
FIG. 6 is a diagrammatic representation of an embodiment involving another method of handling the combustion and the ash.

FIG. 6 illustrates an alternative method of separating the combustion ash from the combustion gases, wherein the combustion gases from lower chamber 2 containing ash which has not already settled out on the floor of chamber 2, pass up through tubes 16 into the upper chamber 3, where it is met by a spray of concentrated liquor which washes the ash out of the gases and falls in a sedimentation cone 17 through which tubes 16 pass; the ash settles out under gravity along the sides of the cone and eventually slides down the sides to the apex of the cone where it is removed by a screwpress 18; dilute spent liquor or water is introduced through a hollow shaft turning the screw such that it enters the shaft by the exit end of the screwpress and flows counter current to the flow of ash and tends to wash out the concentrated liquid entrained with the ash, the mixture of compressed hot ash and hot dilute liquor partly flashes into steam in conduit 19 which leads to cyclone - flash chamber 20 where the ash and steam are further flashed and separated. The concentrated liquid in the sedimentation cone 17 overflows into a hot well reservoir 10 which lies under the upper lip of cone 17; pump and piping 8 remove concentrated liquor from reservoir 10 and recycle it through chamber 3 until it reaches the desired combustible concentration; if water is used in the screwpress dilute spent liquor can be added to the recirculating concentrated liquor before pump 8 or sprayed into chamber 3 above the concentrated liquor sprays, as described for FIG. 5; as described in connection with FIG. 4, during the spraying of the liquor into the hot combustion gases, water evaporates from the liquor and leaves with the combustion gases through vent 14 at the top of chamber 3, concentrated liquor is tapped off from piping 8 and sprayed into combustion chamber 2 where with or without the help of auxiliary fuel it is burnt to form combustion gases and inorganic ash; combustion ash which settles out on the floor of chamber 2 can be removed in a number of conventional ways.

Figure 7:
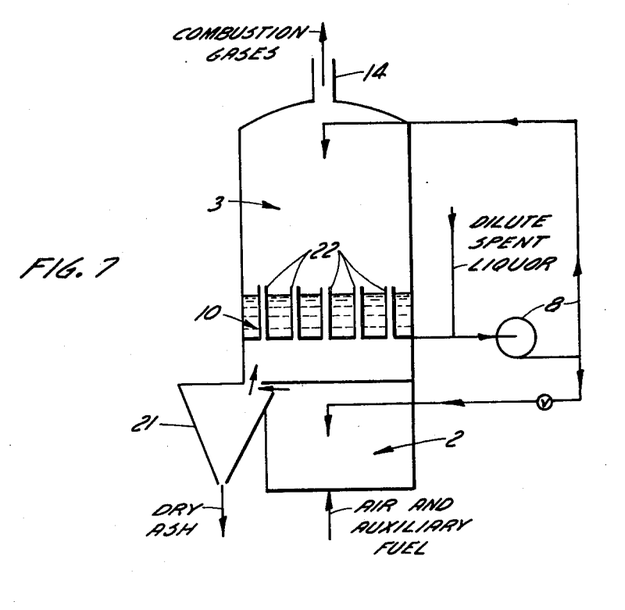
FIG. 7 is a diagrammatic representation of an embodiment involving still another method of handling the combustion and the ash.

FIG. 7 illustrates a further method of separating the ash from the combustion gases, wherein the combustion gases from a chamber 2 similar to that of FIG. 6 pass through a cyclone separator 21 where the dry ash is separated from the combustion gases which then pass into a conduit feeding a number of tubes 22 which pass up through hot well reservoir 10 into chamber 3 where, as described in the above in connection with FIG. 6, they come into intimate contact with the sprayed recycling concentrated liquor, further description in connection with FIG. 6 also applies here.

In the above and in the accompanying figures, for purposes of simplicity of presentation the generation of intimate and turbulent contact between the gases and the liquor has been described simply as a spraying step with the spray nozzles shown in the usual conventional places. However, in an actual design the utmost effort should be made to create the greatest turbulence possible as well as to raise the water vapour content of the combustion gases to as high a level as possible as soon as possible after the combustible material has begun to burn. This can be done by spraying as much liquor as possible into the burning zone (particularly dilute liquor) as it can tolerate without creating incomplete combustion as well as spraying liquor into the freeboard area from as many angles as possible (somewhat in the fashion as is used in dish washers and the like) as one of the objectives of the present invention at least for most of its embodiments, is to bring the burning and concentrating steps as close together as is possible short of creating incomplete combustion. To this end, techniques involving so-called submerged combustion can be used to advantage in this process.

Figure 8:
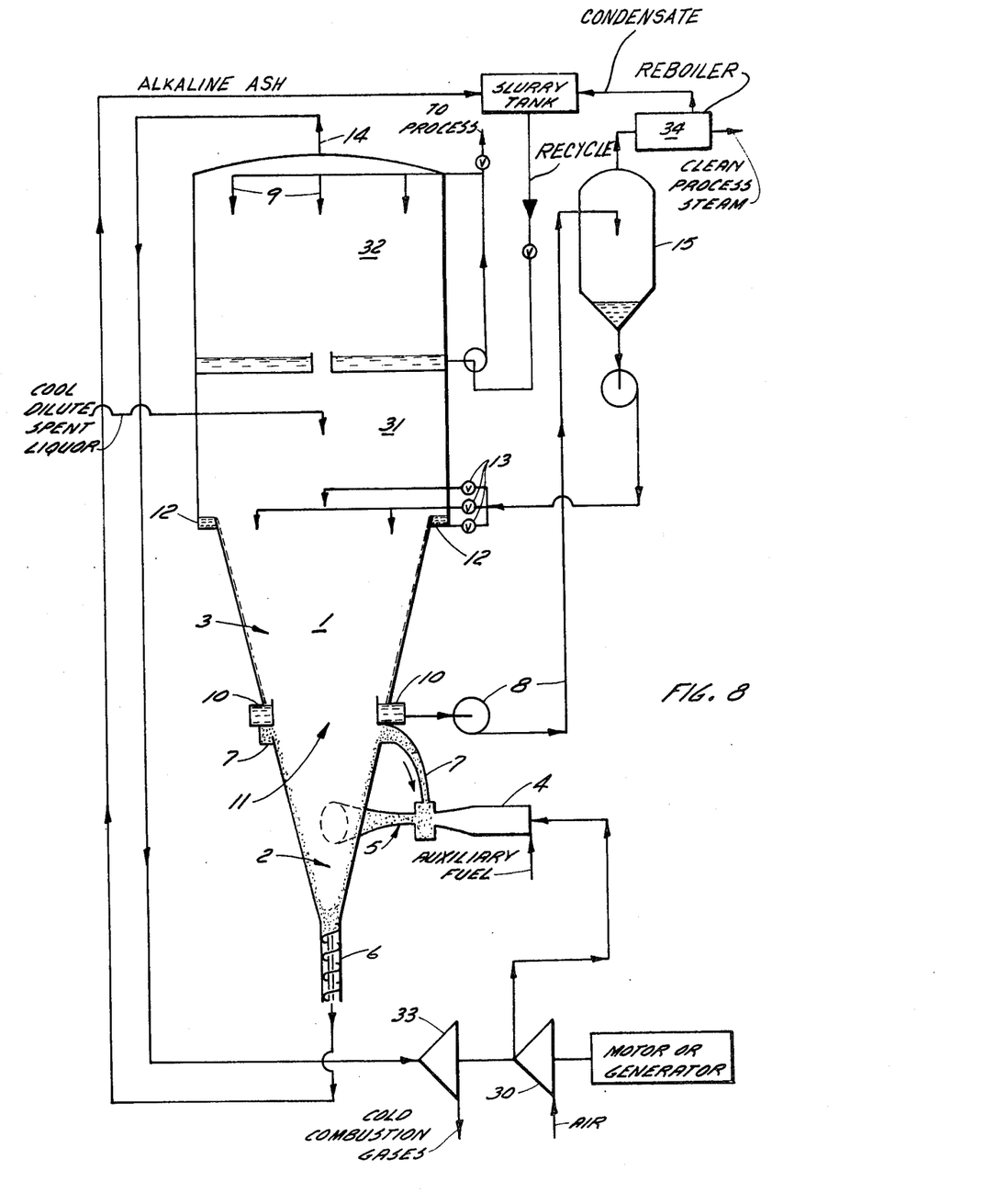
FIG. 8 is a diagrammatic representation of an embodiment in which the method and apparatus of this invention is carried out at an elevated pressure and temperature.

In the above, the emphasis has been on the concentration and burning aspects with disposal as the main objective. In situations where thermal efficiencies are a second main objective, the present invention can be further modified to place the thermal efficiency of the process at practically any desired level depending on the use to which the thermal values of the steam produced by the flash evaporator can be put. FIG. 8 illustrates an embodiment of the present invention in this regard.

Prior to describing the embodiment illustrated in FIG. 8 which operates essentially at a gas pressure substantially higher than atmospheric, it is to be noted that under certain circumstances the process of the present invention could operate at near atmospheric pressures with fairly high thermal efficiency. For example, in situations where quantities of cold water are available, the steam from the flash chamber (as per the example used in connection with FIGS. 2 and 5) could be passed through condensing steam turbines and the condensation of steam effected at temperatures near 100°F (i.e. high vacuum conditions) through the use of water spray towers (to again keep equipment cost at a minimum through use of direct-contact heat-exchange). The steam turbines could be used to produce mechanical energy directly or electrical energy via the use of generators.

The following embodiment could also be used to increase the thermal efficiency of the process when operated at atmospheric pressures. The flue gases containing a large quantity of heat in the form of water vapour could be brought into contact with a cool water-insoluble liquid, such as fuel oil, for example, by spraying cool oil in a second direct-contact heat-exchanger counter current to the flow of the combustion gases after they have left the first direct-contact heat-exchanger tower as described in the above example involving concentration and burning of spent pulping liquor. The water vapour would condense to form liquid water giving up its latent heat thereby heating the oil (to approximately 212°F). The condensed hot water could be separated from the hot oil in the sump of the heat-exchanger and either be discarded or used elsewhere. the hot oil would then be pumped to a third direct-contact heat-exchanger tower where it would again be sprayed down counter current to atmospheric cool dry air; in this latter step, the air would cool the oil which after collecting in the sump would be recycled back to the second heat-exchange tower to be reheated by the moist combustion gases as described. The air now heated by the oil and its evaporative capacity increased thereby is then passed counter current to dilute spent liquor in a fourth direct heat-exchanger tower. In the fourth tower the dilute liquor is concentrated to the degree that this hot dry air is capable of evaporating water from the liquor. The air, cooled and moistened in this fourth tower is now discharged to the atmosphere and liquor from the fourth tower sump is fed to the main first direct-contact heat-exchanger for further evaporation. While this latter embodiment would appear to defeat one of the objectives of the invention namely, simplicity, it could be used to improve the thermal efficiency of a system already installed on the basis of one of the above simpler embodiments and where its conversion to one at much higher gas pressures would be impractical, and to do so, without resorting to fairly expensive indirect methods of heat transfer and multiple-effect evaporation.

The representation of the apparatus in FIG. 8 is essentially the same as that used in FIGS. 4 and 5 and reference should be made to the above text in connection with these figures for a description of the process flow. FIG. 8 differs from FIGS. 4 and 5 in the following respects.

Air is sent to a turbo compressor 30 to increase the pressure of the air to the desired level, in the present illustration, to approximately 250 psia. This compressed air is then fed to the ignition chamber where, as explained above, it provides the oxygen necessary for combustion and raises the pressure in the various processing areas, e.g. combustion, direct-contact heat exchange, gas cooling and absorption to approximately 250 psia. For better thermal efficiency, the combustion gases may be cooled by the cool dilute spent liquor in a separate cooling direct-contact heat exchange zone or chamber 31; this cooling condenses the water vapour in the gases and returns its heat content to the system. If a gas absorption stage or chamber 32 is required in an overall system, it may be advantageously added right after the cooling stage 31. To maintain a high overall efficiency the gases may then be passed through gas expander 33 where most of the energy of compression is reclaimed and used to compress further air and/or generate other forms of energy, e.g. electrical energy. As an alternate to air and compressor 30, tonnage oxygen may be used. Prior to passage through the gas expanders or turbines the gases may have to be heated to avoid freezing problems in the turbines.

The use of higher gas pressures in the direct-contact heat-exchange chamber 3 allows the liquor in hot-well 10 to reach higher temperatures. These temperatures will depend also on the composition of the gas used for combustion, the type of fuel and its gaseous combustion products. In the present example, using air and a fuel haveing a BTU value of 18,000 and combustion products similar to that for coal and the like, a hot-well temperature of approximately 358°F may be reached. Thus, the concentrated liquor at this temperature is then flashed evaporated in chamber 15 where it is subjected to a pressure less than that in vessel 1 or 3, but corresponding to that desired such that the steam produced can be used in other processes. In the present example, the pressure in chamber 15 was maintained at 70 psia which corresponds to a steam or liquid equilibrium temperature of 303°F. If clean process steam is desired the steam flashed in chamber 15 can be put through a reboiler 34 to produce steam at a pressure of approximately 60 psia.

In situations involving the cyclic recovery of chemicals from pulping spent liquors, the chemical ash, usually basic in nature and obtained from the combustion of the liquor, can be slurried and used to recover the acidic component of the liquor which is usually present in the combustion gases. This aspect is illustrated in FIG. 8. Here the alkaline ash is slurried with condensate from the reboiler 34 and the slurry cycled through a gas absorption tower 32, which can form a part of the pressure heat recovery system, to recover the acidic component in the combustion gases. The chemical solution or slurry so formed can then be sent to the pulping liquor preparation system for further use in the pulping process. The steam too from the flash chamber or the reboiler 34 can be used in the pulping process. In this sense, the present invention can form a part of an overall cyclic chemical and heat pulping process.

In the case for using the same system for the disposal of more than one waste where these wastes cannot be mixed for incineration purposes, for example, in the disposal of spent pulping liquor and bark. In such a case, the furnace could be divided into separate areas so that the ash from the incineration of each waste can be collected separately yet the combustion gases from the various incineration areas can be combined and sent to a common direct-contact heat-exchanger.

The range of process parameters of the invention, such as pressure and temperature, are determined essentially by current economics and the state of the art in the related technologies as well as by well known natural laws. Thus, if it is desirable to produce process steam at a fairly high pressure than natural laws will dictate the pressure required in the combustion chamber and main heat-exchange vessel, such a pressure may be of the order of 1000 psia or more, and if it is economical to compress air to this pressure or to use tonnage oxygen then the production of steam at said high pressure could be economically feasible.

The efficiency of the initial direct contact heat-exchange (i.e. the conversion of the sensible heat of the hot gases into the latent heat of evaporation of the water from the liquor) can be increased by use of the venturi principle in many of the above direct-contact heat-exchangers. In such a case for example, the hot gases would be fed into/through a venturi device (U.S. Pat. 3,469,617 illustrates one such device) to which will also be fed part of the cooled liquor from the flash chamber. The proportion of hot gases to liquor and the design of the venturi will depend on the heat balance desired, temperature of gases etc. One objective might be to combine the gases and liquor such that the gas will remain below the water saturation point so that following the venturi-mixing of the gases and liquor, the mixture would be scrubbed by a spray of the remaining cooled liquor.

In all of the above direct-contact heat-exchanger steps an important feature of the present invention is that the liquid being heated or cooled in the heat-exchanger is continuously recycled through the heat-exchanger at a rate independent of the rate at which liquid is added or taken away from that particular heat-exchanger step. For purposes of diagram simplicity, this feature is not shown in FIGS. 2, 3, 5 and 8. FIG. 1, on the other hand, illustrates this feature clearly. In case of FIG. 8, for example, part of the liquor from pump 8 would recycle continuously to the various spray points in chamber 1 at a rate determined independently of the balance of the flow of the liquor from pump 8 to chamber 15; the liquor from chamber 15 would then, at its own flow rate, also be recycled continuously to the various spray points in chamber 1. This allows for the operations in the direct-contact heat-exchanger to be controlled separately from those in the flash chamber.

In certain applications, where undesirable volatile pollutants are present in the waste and minimum overall pollution is required, various other embodiments can be used. For example, by adding certain chemicals to the recycling liquor these undesirable volatile pollutants could be kept in solution; the addition of alkali such as lime or caustic, for example, would keep certain acidic volatile pollutants (e.g. $SO_2$, $H_2S$ etc.) in the liquor so that they would appear later in the combustion ash or smelt. In cases where the condensate from the flash chamber will become polluted by undesirable volatile pollutants, (in place of or in addition to the above chemical addition), the direct-contact heat-exchange and flashing steps may be divided into two so that the initial liquid waste may be partly concentrated separately and the volume of contaminated condensate kept to a minimum. Where these volatiles are organic or less objectionable after being burnt, they may be stripped from the waste and/or as much raw waste as possible introduced into the combustion zone.

The application of this invention to municipal wastes or sewages would be very similar to that described above for the spent materials from pulp and paper mills as in these cases, water would be the main volatile. Materials in the wastes, difficult to spray or to bring into intimate contact with the hot gases could be removed in settling tanks and the thickened sludge incinerated in the combustion chamber with the aid of auxiliary fuels; the dilute effluents would be concentrated as described and incinerated also.

The application of the invention to spent materials from such industries as the oil industry would require some modification as the volatiles (volatile, that is, relative to the much less volatile constituents in the material) would often be combustible as well. In which case, before bringing the hot gases in contact with these combustible volatiles, the temperature of the gas would have to be reduced below the flash point of the volatile. This could be easily accomplished by passing the gases through a series of water cooled coils, fins and the like. The volatile can be recovered from the flash chamber by condensing the gas or vapour produced therein.

Another very interesting application of the present invention lies in the generation of mechanical or electrical power with turbines operated on "power gas" produced from coal or oil especially for that type of gas (such as Lurgi power gas) which when burnt produces a substantial amount of water vapour. For such an application, an embodiment of the present invention could be described as follows: compressed air or (tonnage) oxygen and power gas would be fed to a combustion chamber closely connected to a direct contact heat-exchanger unit similar to that described herein except no provision for ash removal would be necessay, where the gas would be burnt at as high a pressure as would be economically feasible; the heat-exchanger unit and flash chamber would be run as described above except ordinary water would be used in place of spent industrial material; the compressed gases from the heat-exchanger unit would be passed through gas turbines and steam from the flash chamber used to operate steam turbines the energy from these turbines would be used to generate electricity (and if necessary operate the air compressors). Other embodiments of the present invention mentioned herein could also be used to help solve other problems e.g. pollution, heat losses, etc. associated with the use of power gas for generation of energy.

The present invention could of course be used in a similar manner for other thermal units (using oil or coal directly in the combustion chamber, for example).

An even more interesting application would be where such thermal units could be used in association with the problem of incinerating and concentrating industrial and municipal wastes, in which case the above heat exchanger water would be replaced by such wastes and the process of this invention used effectively in both the energy and pollution problems of the day.

From the above description, it will be seen that there is provided an apparatus which includes a means of heating a gas to a desired temperature, means of introducing said gas into a vessel containing a lower reservoir of the material to be treated and an upper freeboard area, means for removing a portion of said material from said reservoir and of subjecting it to and/or bringing it into intimate contact with said heated gas within said freeboard area, means of collecting that material in said freeboard area which is still in liquid form and of conveying it to said reservoir, means to continue heating and introducing a gas, means of removing, subjecting, collecting and conveying the material in a recycle fashion until the material has changed to a desired state, means of introducing sufficient unchanged material to said reservoir and of removing sufficient changed material from said reservoir in order to maintain the recycling material at the desired state. From the above description and diagrams it will be readily apparent what other means will be required to implement the various embodiments of this invention.

Inasmuch as the foregoing description comprises preferred embodiments of the invention which were selected merely for purposes of illustration, it is understood that the invention is not restricted thereto and that modifications and variations may be made therein in accordance with the principles disclosed without departing from the invention.

I claim:

1. A process suitable for the continuous and simultaneous concentration and incineration of a dilute material at substantially any desired thermal efficiency, said material containing a combustible constituent and an incombustible non-volatile constituent diluted by a volatile easily condensable incombustible liquid, the process comprising the steps of continuously incinerating, at a given pressure dependent on said desired thermal efficiency and with the aid of a combustion supporting gas, a first portion of the material in the form of a combustible concentrate thereby producing an ash containing said incombustible constituent and hot radiant gases which gases include said liquid as a condensable vapor and relatively non-condensable combustion gases formed from the combustion of said combustible constituent, said combustible concentrate being as dilute as possible consistent with said combustibility so as to maximize the content of said vapor in said radiant gases; continuously adding a volume of said dilute material to a second portion of said concentrate, continuously bringing said hot radiant gases now saturated and cooler into intimate and turbulent contact for efficient and rapid direct-contact heat exchange with said second portion of said material less concentrated than said first portion whose temperature is lower than the highest temperature it could have when in equilibrium with said gases at said given pressure, such that maximum simultaneous use is made of the three main modes of heat exchange namely, radiant, mass and conductive exchange, all within one given region by providing the required space, time and contact for (i) maximizing said exchange particularly said mass exchange, and simultaneously (ii) heating said further portion and (iii) cooling said hot gases and (iv) saturating said noncondensable gases with said vapor; continuously removing said heated second portion from said region; continuously flash evaporating said removed heated second portion at a pressure lower than said given pressure to thereby (a) convert a part of said liquid present in said removed second portion into a condensable vapor substantially free of said uncondensable gases, and (b) further concentrate said removed second portion and (c) cool said removed second portion to a temperature lower than said equilibrium temperature; continuously removing said gas-free condensable vapor from said flash evaporating step and recovering its heat value as a process vapor thereby establishing the desired thermal efficiency, continuously removing a small volume of said now further concentrated second portion for use as said combustible concentrate; continuously returning the large remaining volume of said cooled concentrated second portion to said region for further direct-contact heat exchange with further hot gases; and continuously removing said cooled hot saturated gases and said ash from said region.

2. The process of claim 1 wherein the given pressure is above atmospheric pressure.

3. The process of claim 1 wherein the liquid is water.

4. The method of claim 1 wherein the gas is air.

5. The process of claim 1 wherein the gas is substantially pure oxygen.

6. A method for the continuous removal and recovery of a volatile easily condensable liquid from a mixture of a dilute material and a concentrate of a non-volatile constituent in said material at substantially any desired thermal efficiency, said material containing said non-volatile constituent diluted by said liquid, which comprises: continuously producing hot radiant gases at a given pressure dependent on said desired thermal efficiency, said hot gases containing relatively non-condensable gases and a liquid as a condensable vapor; continuously adding a volume of said dilute material to a further portion of said concentrate, continuously bringing said hot radiant gases into intimate and turbulent contact for efficient and rapid direct-contact heat exchange with said concentrated further portion whose temperature is lower than the highest temperature it could have when in equilibrium with said gases at said given pressure, such that maximum simultaneous use is made of the three main modes of heat exchange namely, radiant, mass and conductive exchange all within one given region by providing the required space, time and contact for (i) maximizing said exchange particularly said mass exchange, and simultaneously (ii) heating said concentrated further portion and (iii) cooling said hot gases; and (iv) saturating said noncondensable gases with said vapor; continuously removing said heated concentrated further portion from said region; continuously flash evaporating said removed concentrated further portion at a pressure lower than said given pressure to thereby (a) convert a part of said liquid present in said removed further portion into a condensable vapor substantially free of said uncondensable gases, and (b) further concentrate said removed further portion and (c) cool said removed further portion to a temperature lower than said equilibrium temperature; continuously removing said gas-free condensable vapor from said flash evaporating step and condensing it to recover said liquid and its heat value thereby establishing a desired thermal efficiency; continuously removing and recovering said further portion; continuously returning said further cooled portion to said region for further direct-contact heat exchange with further hot gases; and continuously removing said cooled hot gases from said region.

* * * * *